United States Patent
Nakanishi

(10) Patent No.: US 8,953,878 B2
(45) Date of Patent: Feb. 10, 2015

(54) IMAGE COMPRESSOR, IMAGE PROCESSING SYSTEM, AND METHOD FOR COMPRESSING IMAGE

(71) Applicant: Kabushiki Kaisha Toshiba, Tokyo (JP)

(72) Inventor: Keiri Nakanishi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 164 days.

(21) Appl. No.: 13/770,848

(22) Filed: Feb. 19, 2013

(65) Prior Publication Data

US 2013/0251255 A1 Sep. 26, 2013

(30) Foreign Application Priority Data

Mar. 23, 2012 (JP) .................. 2012-068124

(51) Int. Cl.
G06K 9/36 (2006.01)
G06K 9/46 (2006.01)
G06T 9/00 (2006.01)

(52) U.S. Cl.
CPC ....................... *G06T 9/00* (2013.01)
USPC ......................... 382/166; 382/323

(58) Field of Classification Search
None
See application file for complete search history.

(56) References Cited

U.S. PATENT DOCUMENTS

| | | | | |
|---|---|---|---|---|
| 6,970,608 | B1 * | 11/2005 | Michael | 382/299 |
| 7,256,831 | B2 * | 8/2007 | Iizuka | 348/315 |
| 7,400,353 | B2 * | 7/2008 | Hatano | 348/308 |
| 7,421,132 | B2 | 9/2008 | Okada | |
| 8,306,362 | B2 * | 11/2012 | Compton | 382/299 |
| 8,531,543 | B2 | 9/2013 | Sugiyama | |
| 2005/0141722 | A1 | 6/2005 | Van De Kerkhof et al. | |
| 2005/0141772 | A1 | 6/2005 | Okada | |
| 2007/0024931 | A1 * | 2/2007 | Compton et al. | 358/512 |
| 2009/0257491 | A1 | 10/2009 | Kondo et al. | |
| 2011/0149110 | A1 | 6/2011 | Sugiyama | |

FOREIGN PATENT DOCUMENTS

| | | |
|---|---|---|
| JP | H4-65975 A | 3/1992 |
| JP | 2000-354193 A | 12/2000 |
| JP | 2002-171531 A | 6/2002 |
| JP | 2003-224868 A | 8/2003 |
| JP | 2005-191939 A | 7/2005 |
| JP | 2006-332955 A | 12/2006 |
| JP | 2011-015347 A | 1/2011 |
| JP | 2011-130275 A | 6/2011 |
| JP | 2011-239424 A | 11/2011 |
| JP | 2011-239456 A | 11/2011 |

OTHER PUBLICATIONS

Notification of Reason for Rejection, mailed by JPO on Jun. 27, 2014 in Japanese Patent Application No. 2012-068124 (to which is the present application claims priority), 8 pages.

* cited by examiner

*Primary Examiner* — Anand Bhatnagar
*Assistant Examiner* — Soo Park
(74) *Attorney, Agent, or Firm* — Knobbe, Martens, Olson & Bear, LLP

(57) ABSTRACT

According to one embodiment, it is provided that an image compressor includes an image data controller, first to third encoders and an encoded data generator. The image data controller extracts first to third pixels. The first encoder encodes a target first pixel and generates a first encoded pixel. The second encoder encodes a target second pixel and generates a second encoded pixel. The third encoder encodes a target third pixel and generates a third encoded pixel. The encoded data generator combines the first to third encoded pixels and generates encoded data.

20 Claims, 7 Drawing Sheets

IMAGE COMPRESSOR, IMAGE PROCESSING SYSTEM, AND METHOD FOR COMPRESSING IMAGE

CROSS REFERENCE TO RELATED APPLICATION(S)

This application is based upon and claims the benefit of priority from the prior Japanese Patent Application No. 2012-068124, filed on Mar. 23, 2012, the entire contents of which are incorporated herein by reference.

FIELD

Embodiments described herein relate generally to an image compressor, an image processing system, and a method for compressing image.

BACKGROUND

As a conventional image encoding method, a method of calculating a predicted pixel, quantizing the predicted pixel obtained by the calculation, and encoding quantized data obtained by the quantization is known. As the calculation method for the predicted pixel, a method of using a plurality of reference pixels which are close in the horizontal direction every color component with respect to RGB data arranged according to the Bayer pattern in the SMIA (Standard Mobile Imaging Architecture) is known. In the Bayer pattern, color components a rearranged at intervals of one pixel in the horizontal direction. In other words, a predicted pixel is calculated by using an original pixel which becomes an object of prediction and a reference pixel located at a distance corresponding to two pixels in the horizontal direction from the original pixel.

However, a difference value between the original pixel and the predicted pixel becomes large according to a distance between the reference pixel and the prediction object pixel. Furthermore, as the difference value becomes large, the quantization error also becomes large. In other words, the quantization error in the conventional encoding method is equivalent to a distance corresponding to two pixels.

In general, as the quantization error becomes large, the signal to noise ratio (hereafter referred to as SN ratio) in the encoding falls. Falling of the SN ratio exerts a bad influence upon the picture quality obtained when reproducing decoded data (that is, image data) obtained by decoding coded data.

Furthermore, in the Bayer pattern, although there is no sensitivity difference between pixels in the horizontal direction, there is a sensitivity difference between pixels in the vertical direction. Even if the interval in the vertical direction is one pixel or less, therefore, calculation of the predicted pixel based upon the original pixel located in the closest position in the vertical direction brings about lowering of the SN ratio at the time of encoding processing.

DETAILED DESCRIPTION

Embodiments will now be explained with reference to the accompanying drawings.

In general, according to one embodiment, it is provided that an image compressor includes an image data controller, a first encoder, a second encoder, a third encoder, and an encoded data generator. The image data controller extracts, from image data having color components of at least three kinds arranged in accordance with a Bayer pattern, first pixels, second pixels and third pixels. The first pixels correspond to a first color component included on a first line and a second line of the image data. The second pixels correspond to a second color component included on the first line. The third pixels correspond to a third color component included on the second line. The first encoder refers to a reference first pixel located close to a target first pixel to be encoded in a column direction in the image data, encodes the target first pixel, and generates a first encoded pixel. The second encoder refers to a reference second pixel located close to a target second pixel to be encoded in a row direction in the image data, encodes the target second pixel, and generates a second encoded pixel. The third encoder refers to a reference third pixel located close to a target third pixel to be encoded in the row direction, encodes the target third pixel, and generates a third encoded pixel. The encoded data generator combines the first encoded pixel, the second encoded pixel and the third encoded pixel, and generates encoded data.

Figures 1, 2:
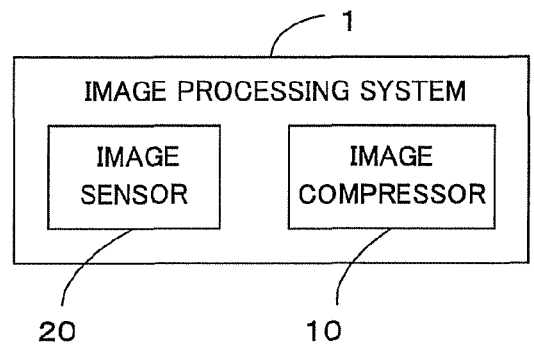
FIG. 1 is a block diagram of an image processing system 1 of the embodiments.
FIG. 2 is a schematic diagram of image data of the embodiments.

Embodiments will be described with reference to the drawings. First, a configuration of an image processing system 1 in the embodiments will be described. FIG. 1 is a block diagram of an image processing system 1 of the embodiments. The image processing system 1 includes an image compressor 10 and an image sensor 20. The image sensor 20 is a module (for example, a CMOS (Complementary Metal Oxide Semiconductor) sensor) which generates image data (for example, RGB data). The image compressor 10 compresses the image data generated by the image sensor 20.

Image data in the embodiments will now be described. FIG. 2 is a schematic diagram of image data of the embodiments. FIG. 2 is a schematic diagram of image data in the embodiments. FIG. 2 shows one hundred pixels arranged in a matrix of ten columns (C0 to C9) in a row direction (H direction) by ten lines (L0 to L9) in a column direction (V direction) according to the Bayer pattern. Image data includes pixels (a first pixel G, a second pixel R, and a third pixel B) corresponding to color components (first to third color components) of three kinds. For example, image data is Bayer RAW data.

The first pixel G is a pixel which appears on all lines Ln {n: 0 to 9} and all columns Cm {m: 0 to 9}. The first pixel G is arranged at intervals of one pixel in the H direction and the V direction. In other words, a first pixel close to a first pixel G(Ln, Cm) in the H direction and the V direction is a first pixel G(L(n+1), C(m+1)) located at a distance corresponding to one pixel in the H direction and the V direction. For example, a first pixel close to a first pixel G(L0, C0) in the H direction and the V direction is a first pixel G(L1, C1).

The second pixel R is a pixel which appears on even-numbered lines L(2j) {j: 0 to 4} and odd-numbered columns C(2i+1) {i: 0 to 4}. The second pixel R is arranged at intervals of one pixel in the H direction and the V direction. In other words, second pixels close to a second pixel R(L(2j), C(2i+1)) in the H direction and the V direction are a second pixel R(L(2j), C(2i+3)) located at a distance corresponding to two pixels in the H direction and a second pixel R(L(2j+2), C(2i+1)) located at a distance corresponding to two pixels in the V direction. For example, second pixels close to a second pixel R(L0, C1) in the H direction and the V direction are second pixels R(L0, C3) and R(L2, C1).

The third pixel B is a pixel which appears on odd-numbered lines L(2j+1) and even-numbered columns C(2i). The third pixel B is arranged at intervals of one pixel in the H direction and the V direction. In other words, third pixels close to a third pixel B(L(2j+1), C(2i)) in the H direction and the V direction are a third pixel B(L(2j+1), C(2i+2)) located at a distance corresponding to two pixels in the H direction and a third pixel B(L(2j+3), C(2i)) located at a distance corresponding to two pixels in the V direction. For example, third pixels close to a third pixel B(L1, C0) in the H direction and the V direction are third pixels B(L1, C2) and B(L3, C0).

First Embodiment

Figure 3:
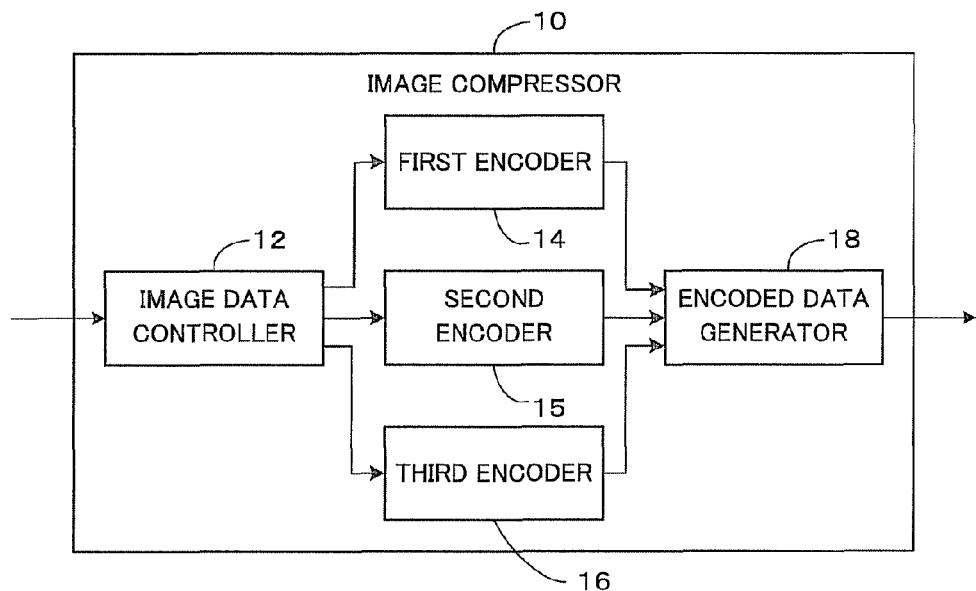
FIG. 3 is a block diagram of the image compressor 10 of the first embodiment.

A first embodiment is an example of the image compressor 10 which reduces the quantization error by using a line memory. FIG. 3 is a block diagram of the image compressor 10 of the first embodiment. The image compressor 10 includes an image data controller 12, first to third encoders 14 to 16, and an encoded data generator 18.

The image data controller 12 controls data to be loaded to the first to third encoders 14 to 16. Specifically, the image data controller 12 acquires image data from the image sensor 20, extracts first pixels G, second pixels R and third pixels B from the image data, loads the first pixels G to the first encoder 14, loads the second pixels R to the second encoder 15, and loads the third pixels B to the third encoder 16.

The first encoder 14 applies encoding processing to pixels included on all lines (i.e., even-numbered lines and odd-numbered lines). Specifically, the first encoder 14 refers to a first pixel (hereafter referred to as "reference first pixel") G' which is the closest to a first pixel to be encoded (hereafter referred to as "target first pixel") G in the row direction and the column direction of image data, encodes the target first pixel G, and thereby generates a first encoded pixel.

The second encoder 15 applies encoding processing to pixels included on even-numbered lines.

Specifically, the second encoder 15 refers to a second pixel (hereafter referred to as "reference second pixel") R' which is the closest to a second pixel to be encoded (hereafter referred to as "target second pixel") R in the row direction of image data, encodes the target second pixel R, and thereby generates a second encoded pixel.

The third encoder 16 applies encoding processing to pixels included on odd-numbered lines.

Specifically, the third encoder 16 refers to a third pixel (hereafter referred to as "reference third pixel") B' which is the closest to a third pixel to be encoded (hereafter referred to as "target third pixel") B in the row direction of image data, encodes the target third pixel B, and thereby generates a third encoded pixel.

The encoded data generator 18 generates encoded data. Specifically, the encoded data generator 18 generates encoded data by combining the first to third encoded pixels. The encoded data is supplied to an external module (for example, an external memory and a decoder) connected to the image processing system 1.

Figure 4:
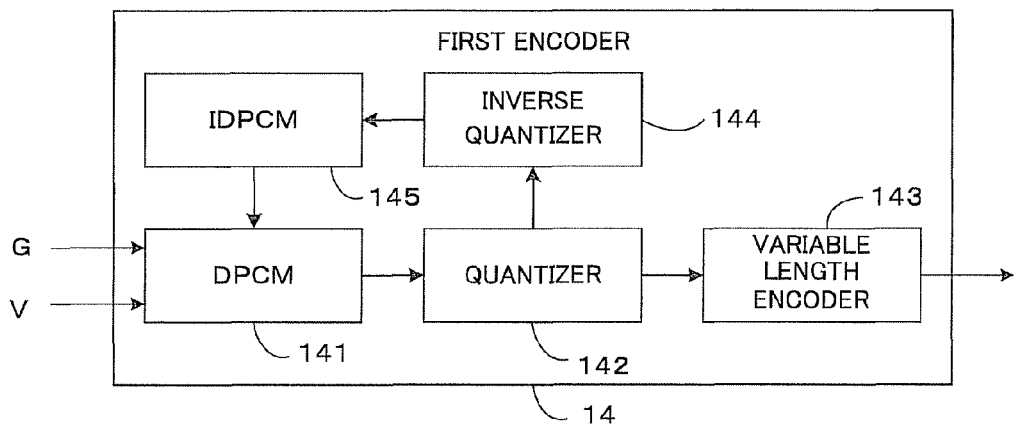
FIG. 4 is a block diagram of the first encoder 14 of the first embodiment.

Configurations of the first to third encoders 14 to 16 in the first embodiment will now be described. FIG. 4 is a block diagram of the first encoder 14 of the first embodiment. By the way, the second and third encoders 15 and 16 have configurations similar to the configuration of the first encoder 14.

The first encoder 14 includes a differential pulse code modulator (hereafter referred to as DPCM) 141, a quantizer 142, a variable length encoder 143, an inverse quantizer 144, and an inverse differential pulse code modulator (hereafter referred to as IDPCM) 145.

The DPCM 141 applies pulse code modulation processing to a local decoded pixel fed back from the IDPCM 145 and the first pixel G according to a valid signal V, and thereby generates a first difference signal which indicates a difference value between the local decoded pixel and the first pixel G. The quantizer 142 quantizes the first difference signal generated by the DPCM 141, and thereby generates a first quantized signal. The variable length encoder 143 applies variable length encoding processing to the first quantized signal, and thereby generates the first encoded pixel. The inverse quantizer 144 inverse-quantizes the first quantized signal, and thereby generates the first difference signal. The IDPCM 145 applies inverse pulse code modulation processing to the first difference signal generated by the inverse quantizer 144, and thereby generates the local decoded pixel.

Figure 5:
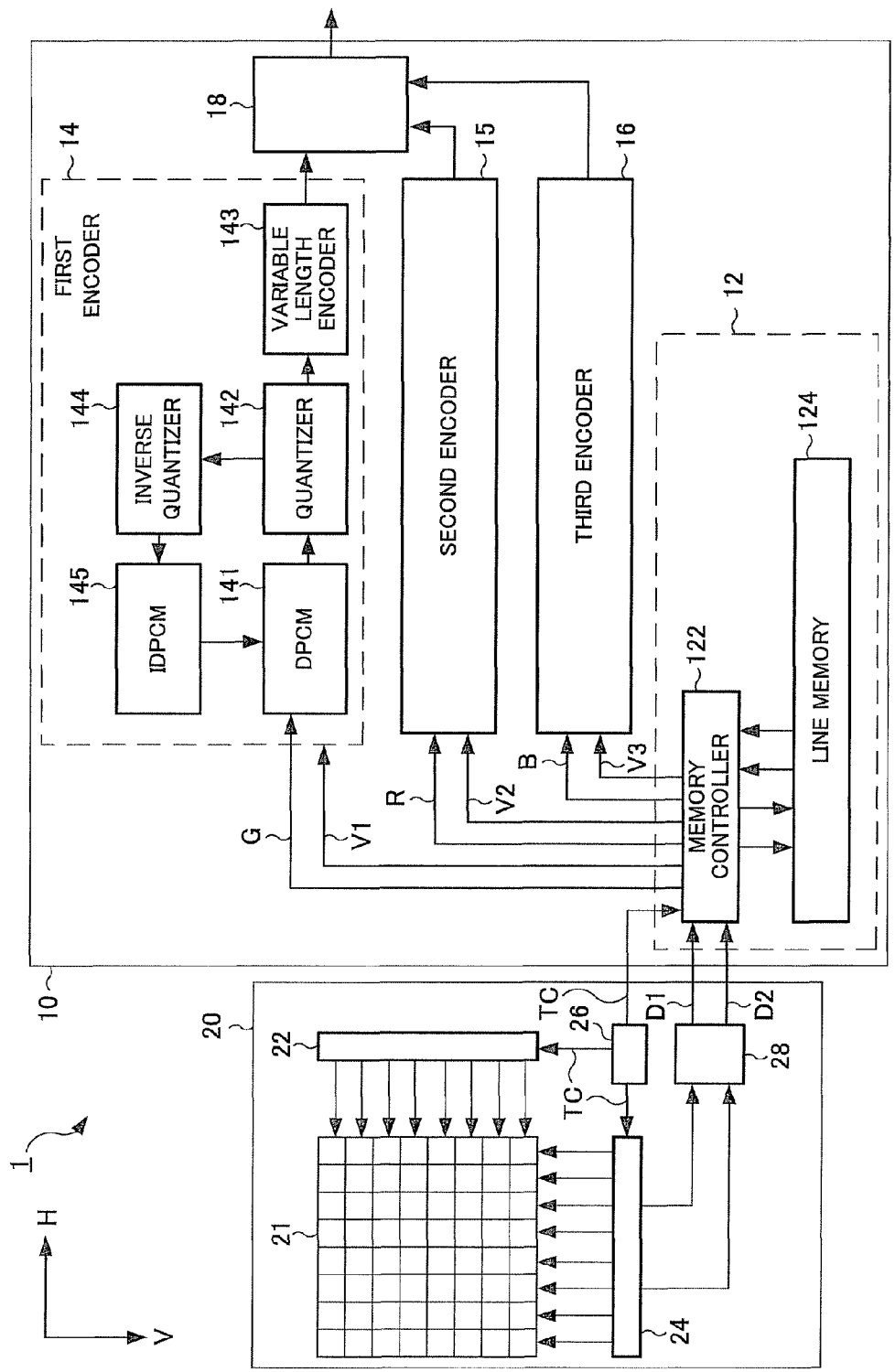
FIG. 5 is a block diagram of the image processing system 1 of the first embodiment.

A configuration of the image processing system 1 of the first embodiment will now be described. FIG. 5 is a block diagram of the image processing system 1 of the first embodiment. The image sensor 20 includes a sensor core 21, first and second read controllers 22 and 24, a timing generator 26, and an analogue to digital converter (hereafter referred to as ADC) 28. The image data controller 12 includes a memory controller 122 and a line memory 124.

The sensor core 21 converts light which is input via a lens (not illustrated) to an electric signal. The sensor core 21 includes a plurality of imaging elements arranged in a row direction (H direction) and a column direction (V direction). An output (electric signal) of the sensor core 21 is a signal representing an image.

The timing generator 26 generates a timing control signal TC. The timing control signal TC controls operation timing of the first and second read controllers 22 and 24 and the memory controller 122.

The first read controller 22 generates a first control signal which specifies a load line every line or every a plurality of lines. The second read controller 24 generates a second control signal which specifies a load pixel position in the H direction every line or every a plurality of lines, specifies a load pixel position on the basis of the load line specified by the first control signal, and loads the electric signal obtained by the conversion conducted by the sensor core 21. For example, the first and second read controllers 22 and 24 include shift registers.

The ADC 28 converts the electric signal loaded by the second read controller 24 to a digital signal (image data shown in FIG. 2). The number of digital signals depends upon the number of columns which are loaded by the second read controller 24. For example, if the second read controller 24 loads the electric signal every two columns, the digital signals are first and second digital signals D1 and D2.

The line memory 124 stores the output (image data) of the ADC 28 by taking a line as the unit. The memory controller 122 controls writing image data into the line memory 124, reading image data from the line memory 124, and operation of the first to third encoders 14 to 16. For example, the line memory controller 122 writes image data of a plurality of lines (for example, four lines) into the line memory 124 in accordance with a first order, loads image data from the line memory 124 in accordance with a second order (i.e., an order different from the first order), and loads the image data G, R and B which are loaded and first to third encoding control signals V1 to V3 to the first to third encoders 14 to 16.

Figure 6:
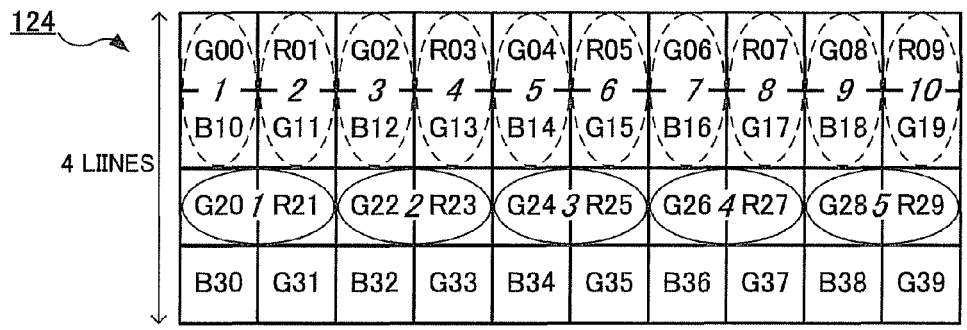
FIG. 6 is a diagram for explaining operation of the memory controller 122 and the line memory 124 of the first embodiment.

An operation example of the memory controller 122 and the line memory 124 will now be described. FIG. 6 is a diagram for explaining operation of the memory controller 122 and the line memory 124 of the first embodiment. In FIG. 6, a dashed line indicates a read operation, whereas a solid line indicates a write operation. "G00" and the like correspond to a first pixel G(L0, C0) and the like in FIG. 2. "R01" and the like correspond to a second pixel R(L0, C1) and the like in FIG. 2. "B10" and the like correspond to a third pixel B(L1, C0) and the like in FIG. 2.

In the writing operation, two pixels are written every one line and two columns in accordance with the first order.

For example, after a first pixel G20 and a second pixel R21 are written, a first pixel G22 and a second pixel R23 are written.

In the reading operation, two pixels are read every two lines and one column in accordance with the second order. For example, after a first pixel G00 and a third pixel B10 are read, a second pixel R01 and a first pixel G11 are read. In other words, the memory controller 122 loads sets of first and third pixels G and B included on an odd-numbered column in two lines and sets of first and second pixels G and R included on even-numbered columns in two lines successively from the line memory 122.

In other words, the memory controller 122 loads a first pixel G (for example, G00) to the first encoder 14, and then loads a first pixel (i.e., a reference first pixel) G (for example, G11) which is close to the first pixel (i.e., target first pixel) G in the column direction to the first encoder 14. Furthermore, the memory controller 122 loads a second pixel R (for example, R01) to the second encoder 15, and then loads a second pixel (i.e., a reference second pixel) R (for example, R03) which is close to the second pixel (i.e., target second pixel) R in the row direction to the second encoder 15. Furthermore, the memory controller 122 loads a third pixel B (for example, B10) to the third encoder 16, and then loads a third pixel (i.e., a reference third pixel) B (for example, B12) which is close to the third pixel (i.e., target third pixel) B in the row direction to the third encoder 16.

Figure 7A:
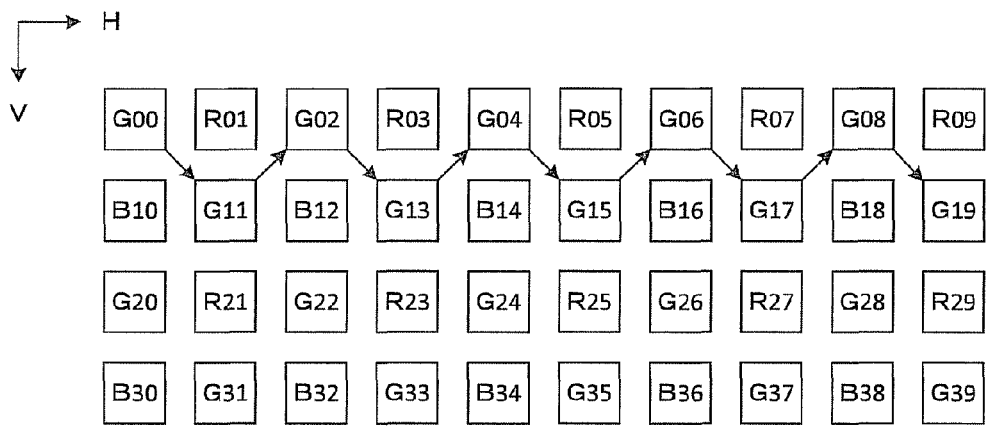
FIGS. 7A and 7B are diagrams for explaining the operation of the DPCM 141 and the IDPCM 142 of the first embodiment.
Figure 7B:
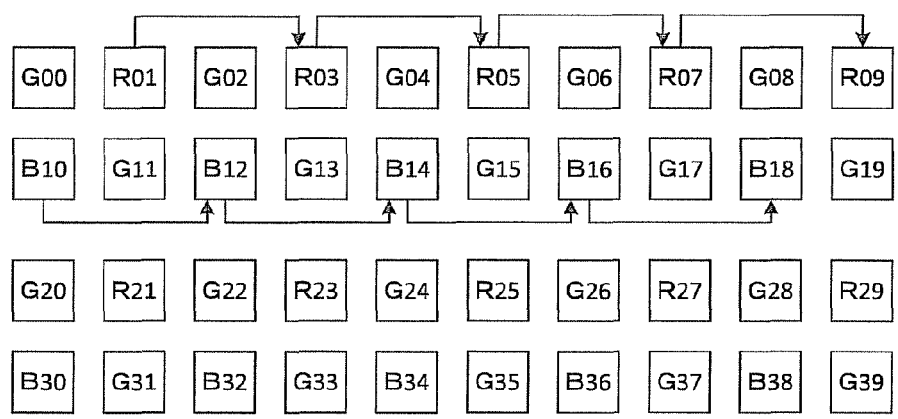

Operation of the DPCM 141 and the IDPCM 142 in the first embodiment will now be described. FIGS. 7A and 7B are diagrams for explaining the operation of the DPCM 141 and the IDPCM 142 of the first embodiment. In FIGS. 7A and 7B, G00 corresponds to the first pixel G(L0, C0) in FIG. 2, R01 corresponds to the second pixel R(L0, C1) in FIGS. 2, and B10 corresponds to the third pixel B(L1, C0) in FIG. 2.

FIG. 7A represents that a local decoded pixel at time when generating a difference signal for a first pixel G11 is a first pixel G00 and a local decoded pixel at time when generating a difference signal for a first pixel G02 is a first pixel G11.

When the DPCM 141 generates a difference signal for the first pixel G02 in the first encoder 14, the IDPCM 145 supplies the first pixel G11 which is the closest in the HV space to the DPCM 141 as a local decoded pixel. Then, the DPCM 141 generates a difference signal which indicates a difference value between the first pixels G11 and G02.

FIG. 7B represents that a local decoded pixel at time when generating a difference signal for a second pixel R03 is a second pixel R01 and a local decoded pixel at time when generating a difference signal for a third pixel B12 is a third pixel B10.

When the DPCM 141 generates a difference signal for the second pixel R03 in the second encoder 15, the IDPCM 145 supplies the second pixel R01, which is close to R03 in the H direction (i.e., which is at a distance corresponding to two pixels from R03 in the H direction), to the DPCM 141 as a local decoded pixel. Then, the DPCM 141 generates a difference signal which indicates a difference value between the second pixels R03 and R01.

When the DPCM 141 generates a difference signal for the third pixel B12 in the third encoder 16, the IDPCM 145 supplies the third pixel B10, which is close to B12 in the H direction (i.e., which is at a distance corresponding to two pixels from B12 in the H direction), to the DPCM 141 as a local decoded pixel. Then, the DPCM 141 generates a difference signal which indicates a difference value between the third pixels B12 and B10.

In other words, when generating a difference signal for a target pixel which becomes an object of encoding, the second and third encoders 15 and 16 select a reference pixel by considering a distance in the H direction. On the other hand, the first encoder 14 selects a reference pixel by considering a distance in both the H direction and the V direction (i.e., a straight line distance).

According to the first embodiment, the quantization error can be reduced. Eventually, lowering of the SN ratio at the time of encoding can be prevented.

Second Embodiment

Figure 8:
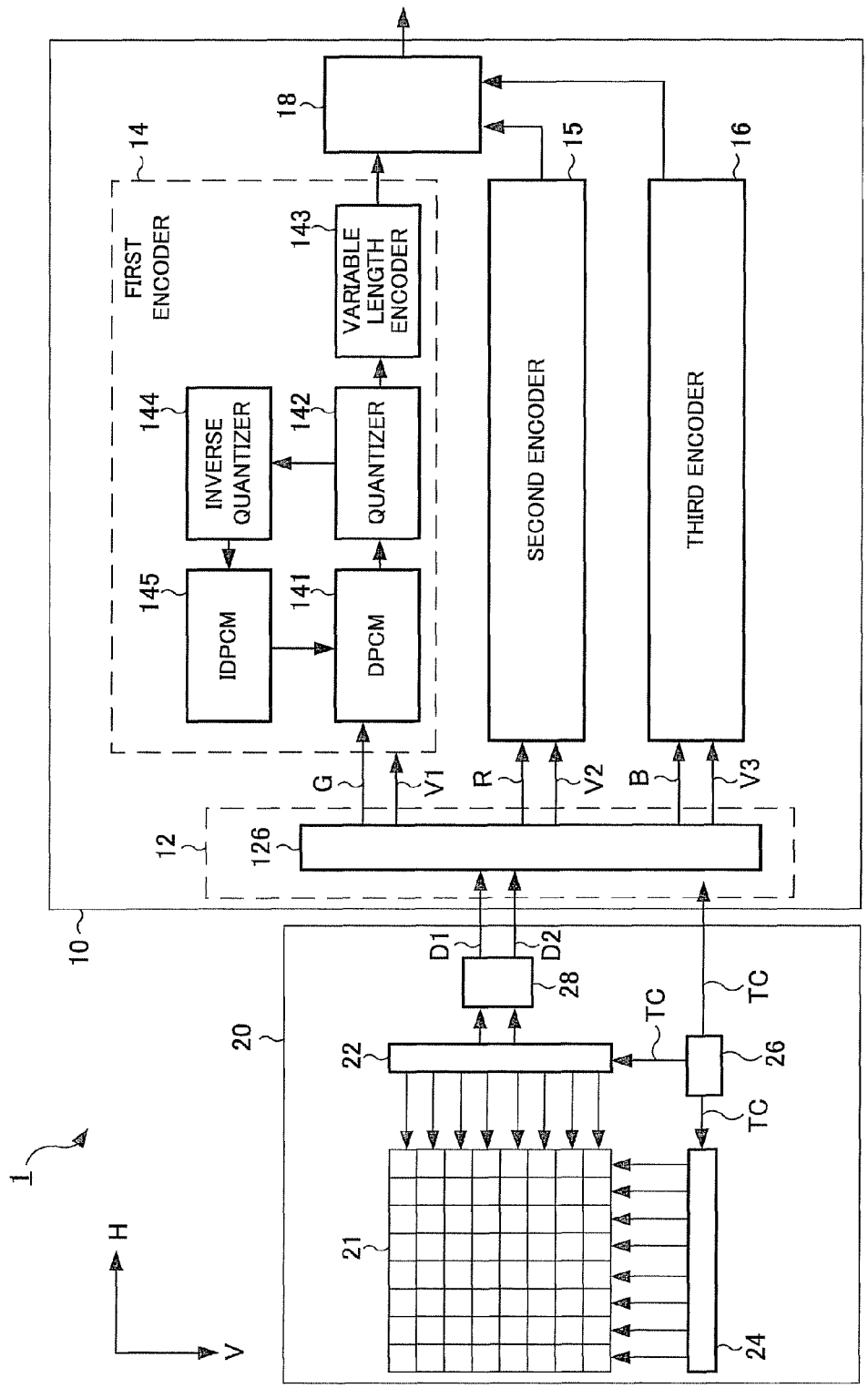
FIG. 8 is a block diagram of the image processing system 1 of the second embodiment.

A second embodiment is an example of an image compression system 1 which reduces the quantization error by using a rearranger instead of the line memory. By the way, the same description as that in the first embodiment will be omitted. A configuration of an image processing system 1 of the second embodiment will now be described. FIG. 8 is a block diagram of the image processing system 1 of the second embodiment. The timing generator 26 generates a clock signal, a horizontal sync signal, and a vertical sync signal. The ADC 28 converts an electric signal, which is read by not the second read controller 24 but the first read controller 22, to image data (FIG. 2) which is a digital signal. The image data controller 12 includes not the memory controller 122 and the line memory 124 in the first embodiment, but a rearranger 126.

Figure 9:
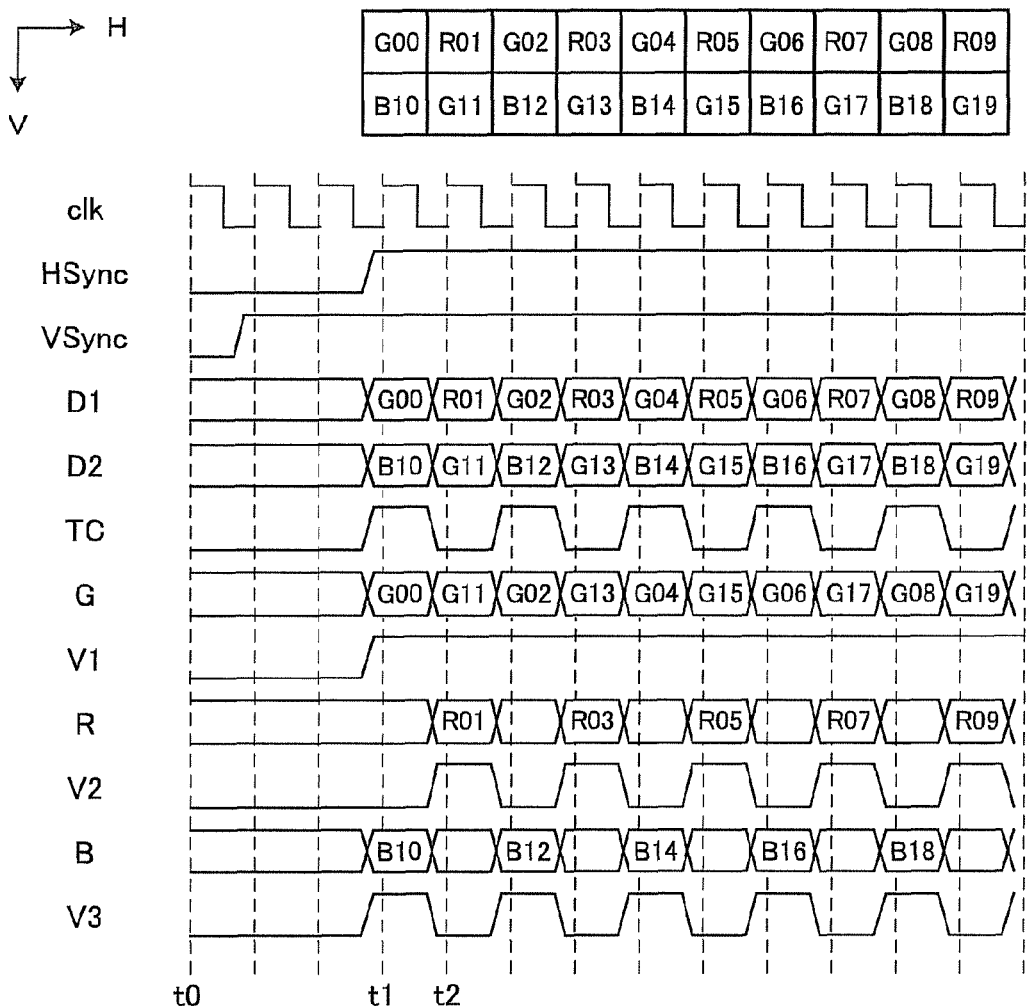
FIG. 9 is a diagram for explaining operation of the rearranger 126 of the second embodiment.

Operation of the rearranger 126 in the second embodiment will now be described. FIG. 9 is a diagram for explaining operation of the rearranger 126 of the second embodiment. In FIG. 9, "G00," "R01," "B10" and the like have the same meaning as those in FIG. 6. In FIG. 9, "clk" is a clock signal, "Hsync" is a horizontal sync signal, "Vsync" is a vertical sync signal, and "D1," "D2," "TC," "G," "R," "B," and "V1" to "V3" are the same as those in FIG. 8.

The first digital signal D1 is a signal obtained by arranging pixels located on even-numbered lines in the order of a first pixel G00, a second pixel R01, and a first pixel G02 (i.e., in the H direction) from a cycle t1, which is a predetermined number of cycles after an initial cycle t0. The second digital signal D2 is a signal obtained by arranging pixels located on odd-numbered lines in the order of a third pixel B10, a first pixel G11, and a third pixel B12 (i.e., in the H direction) from the cycle t1. The timing control signal TC switches between "high" and "low" alternately every cycle from the cycle U.

The first pixels G are loaded to the first encoder 14 in the order of "G00," "G11" and "G02" (i.e., a first pixel G on an even-numbered line and a first pixel G on an odd-numbered line are loaded alternately). The first valid signal V1 has a signal level which is always high (i.e., a signal which validates the first encoder 14) from the cycle t1. When the first valid signal V1 is high, the first pixels G are loaded to the first encoder 14. In other words, the first pixels G are loaded consecutively every cycle from the cycle t1.

The second pixels R are loaded to the second encoder 15 in the order of "R01," "R03" and "R05" (i.e., second pixels R on even-numbered lines are loaded consecutively). The second valid signal V2 has a signal level which switches between "high" (i.e., a signal which validates the second encoder 15) and "low" alternately every cycle from a cycle t2 which is one cycle after the cycle t1. When the second valid signal V2 is high, the second pixels R are loaded to the second encoder 15. In other words, the second pixels R are loaded every two cycles from the cycle t2.

The third pixels B are loaded to the second encoder 15 in the order of "B10," "B12" and "B14" (i.e., third pixels B on odd-numbered lines are loaded consecutively). The third valid signal V3 has a signal level which switches between "high" (i.e., a signal which validates the third encoder 16) and "low" alternately every cycle from the cycle t1. When the third valid signal V3 is high, the third pixels B are loaded to the third encoder 16. In other words, the third pixels B are loaded every two cycles from the cycle t1.

According to the second embodiment, the size of the image data controller 12 can be reduced as compared with the first embodiment.

Third Embodiment

Figure 10:
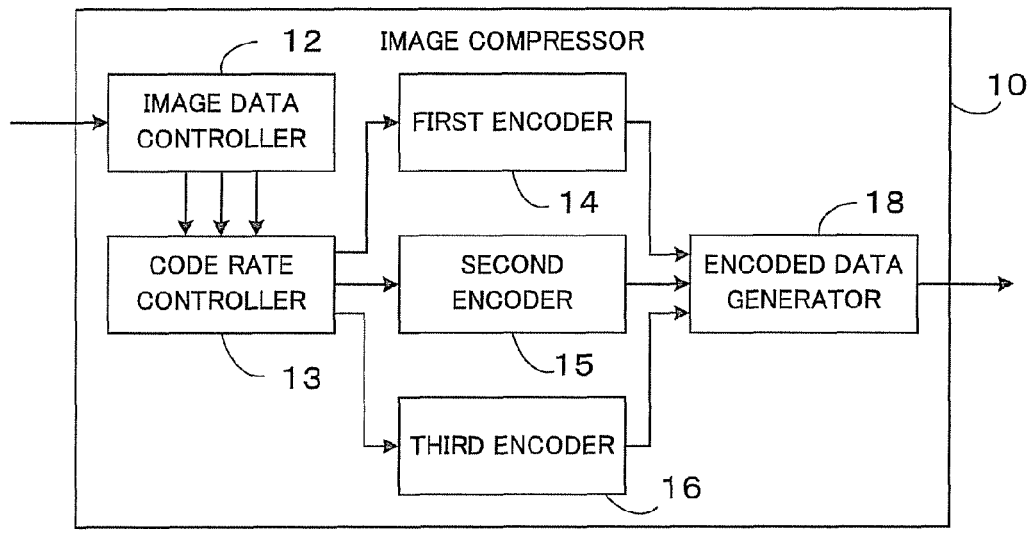
FIG. 10 is a block diagram of an image compressor 10 of the third embodiment.

A third embodiment is an example of an image compressor 10 which controls a code rate in addition to a function similar to that of the first or second embodiment. By the way, the same description as that in the first or second embodiment will be omitted. FIG. 10 is a block diagram of an image compressor 10 of the third embodiment. The image compressor 10 includes a code rate controller 13 in addition to a configuration similar to that of the first embodiment (the image data controller 12, the first to third encoders 14 to 16, and the encoded data generator 18).

The code rate controller 13 generates a code rate control signal. The code rate control signal controls code rates (for example, quantization coefficients) of the first to third encoders 14 to 16. Specifically, the code rate controller 13 acquires image data (first pixels G, second pixels R, and third pixels B) from the image data controller 12, generates a code control signal on the basis of the image data, and loads the image data and the code rate control signal to the first to third encoders 14 to 16. The first to third encoders 14 to 16 encode the target first pixel to the target third pixel on the basis of the code rate control signal, respectively.

Figure 11:
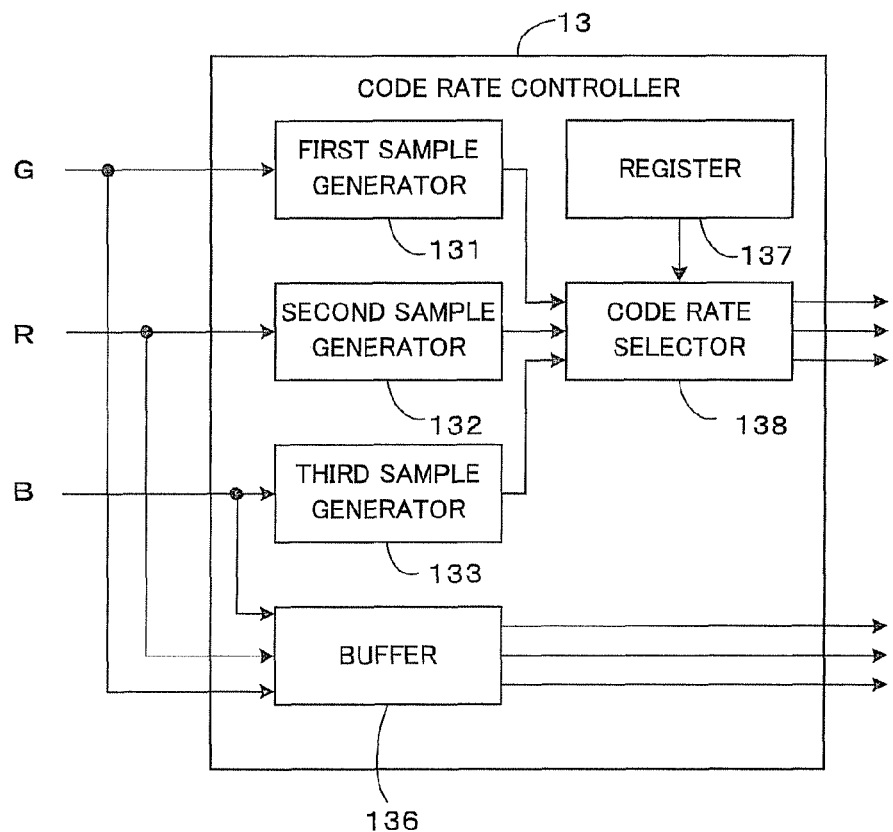
FIG. 11 is a block diagram of the code rate controller 13 of the third embodiment.

A configuration of the code rate controller 13 in the third embodiment will now be described. FIG. 11 is a block diagram of the code rate controller 13 of the third embodiment. The code rate controller 13 includes first to third sample generators 131 to 133, a buffer 136, a register 137, and a code rate selector 138.

The first to third sample generators 131 to 133 apply encoding processing using a plurality of code rates to the first to third pixels G, R and B and thereby generate first to third sample data, respectively. The first to third sample data are sets of encoded data of the first to third pixels G, R and B of every code rate, respectively.

The register 137 stores a matching table which indicates relations between the sample data and optimum code rates. The matching table may be fixed information, or may be variable information (for example, information which can be updated from the external of the code rate controller 13).

The code rate selector 138 selects first to third optimum code rates for the first to third encoders 14 to 16 by using the first to third sample data generated by the first to third sample generators 131 to 133 and the matching table stored in the register 137, and supplies first to third code rate control signals which indicate the first to third optimum code rates to the first to third encoders 14 to 16, respectively.

The buffer 136 stores the first to third pixels G, R and B during a period between the time when the first to third pixels G, R and B are loaded to the code rate selector 138 and the time when the first to third code rate control signals are generated. The first to third pixels G, R and B stored in the buffer 136 are output together with the first to third code rate control signals.

According to the third embodiment, the code rate of the encoded data can be optimized as compared with the first or second embodiment.

By the way, although in the present embodiment an example in which image data includes pixels corresponding to color components of three kinds has been described, the image data may include pixels of four or more kinds. In other words, the image data in the present embodiment includes pixels corresponding to color components of at least three kinds.

At least a portion of the image processing system 1 according to the above-described embodiments may be composed of hardware or software. When at least a portion of the image processing system 1 is composed of software, a program for executing at least some functions of the image processing system 1 may be stored in a recording medium, such as a flexible disk or a CD-ROM, and a computer may read and execute the program. The recording medium is not limited to a removable recording medium, such as a magnetic disk or an optical disk, but it may be a fixed recording medium, such as a hard disk or a memory.

In addition, the program for executing at least some functions of the image processing system 1 according to the above-described embodiment may be distributed through a communication line (which includes wireless communication) such as the Internet. In addition, the program may be encoded, modulated, or compressed and then distributed by wired communication or wireless communication such as the Internet. Alternatively, the program may be stored in a recording medium, and the recording medium having the program stored therein may be distributed.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An image compressor comprising:
   an image data controller configured to extract, from image data having color components of at least three kinds arranged in accordance with a Bayer pattern, first pixels, second pixels and third pixels, the first pixels corresponding to a first color component included on a first line and a second line of the image data, the second pixels corresponding to a second color component included on the first line, and the third pixels corresponding to a third color component included on the second line;
   a first encoder configured to refer to a reference first pixel located close to a target first pixel to be encoded in a column direction in the image data, encode the target first pixel, and generate a first encoded pixel;
   a second encoder configured to refer to a reference second pixel located close to a target second pixel to be encoded in a row direction in the image data, encode the target second pixel, and generate a second encoded pixel;
   a third encoder configured to refer to a reference third pixel located close to a target third pixel to be encoded in the row direction, encode the target third pixel, and generate a third encoded pixel; and
   an encoded data generator configured to combine the first encoded pixel, the second encoded pixel and the third encoded pixel, and generate encoded data.

2. The compressor of claim 1, wherein the first encoder refers to the reference first pixel on the second line when encoding the target first pixel on the first line, and refers to the reference first pixel on the first line when encoding the target first pixel on the second line.

3. The compressor of claim 1, wherein the first encoder comprises:
   a differential pulse code modulator configured to apply differential pulse code modulation processing to the first pixel, and generate a first difference signal indicating a difference value between the local decoded pixel and the first pixel;
   a quantizer configured to quantize the first difference signal and generate a first quantized signal;
   a variable length encoder configured to apply variable length encoding processing to the first quantized signal and generate the first encoded pixel;
   an inverse quantizer configured to inverse-quantize the first quantized signal and generate the first difference signal; and
   an inverse differential pulse code modulator configured to apply inverse pulse code modulation processing to the first difference signal and generate the local decoded pixel.

4. The compressor of claim 1, wherein the image data controller comprises:
   a line memory configured to store the image data by taking a line as unit; and
   a memory controller configured to load the image data stored in the line memory to the first to third encoders.

5. The compressor of claim 4, wherein the memory controller loads the first pixel to the first encoder, and loads a closest first pixel to the first encoder, the closest first pixel being close to the first pixel in the row direction and the column direction.

6. The compressor of claim 4, wherein the memory controller reads a set of the first pixel and the third pixel and a set of the first pixel and the second pixel from the line memory.

7. The compressor of claim 1, further comprising a rearranger configured to rearrange arrangement of the image data to load the first pixels to the first encoder consecutively every cycle, load the second pixels to the second encoder every two cycles, and load the third pixels to the third encoder every two cycles, the third pixels being loaded in cycle in which the second pixels are not loaded.

8. The compressor of claim 1, further comprising a code rate controller configured to control code rates of the first to third encoders on the basis of the first pixels, the second pixels and the third pixels.

9. The compressor of claim 8, wherein the code rate controller comprises:
   a first sample generator configured to apply encoding processing in which a plurality of code rates to the first pixels is used and generate first sample data;
   a second sample generator configured to apply encoding processing in which a plurality of code rates to the second pixels is used and generate second sample data;
   a third sample generator configured to apply encoding processing in which a plurality of code rates to the third pixels is used and generate third sample data; and
   a code rate selector configured to select an optimum code rate on the basis of the first to third sample data, and load the optimum code rate to the first to third encoders.

10. The compressor of claim 9, wherein
    the code rate controller further comprises a register configured to store a matching table indicating relations among the first to third sample data and the optimum code rate, and
    the code rate selector uses the matching table and selects the optimum code rate.

11. The compressor of claim 9, wherein the code rate controller further comprises a buffer configured to store the first pixels, the second pixels, and the third pixels and output the first pixels, the second pixels, and the third pixels together with the optimum code rate.

12. An image processing system comprising:
    an image sensor arranged in accordance with a Bayer pattern and configured to obtain image data having color components of at least three kinds;
    an image data controller configured to extract, from the image data, first pixels, second pixels and third pixels, the first pixels corresponding to a first color component included on a first line and a second line of the image data, the second pixels corresponding to a second color component included on the first line, and the third pixels corresponding to a third color component included on the second line;
    a first encoder configured to refer to a reference first pixel located close to a target first pixel to be encoded in a column direction in the image data, encode the target first pixel, and generate a first encoded pixel;
    a second encoder configured to refer to a reference second pixel located close to a target second pixel to be encoded in a row direction in the image data, encode the target second pixel, and generate a second encoded pixel;
    a third encoder configured to refer to a reference third pixel located close to a target third pixel to be encoded in the row direction, encode the target third pixel, and generate a third encoded pixel; and
    an encoded data generator configured to combine the first encoded pixel, the second encoded pixel and the third encoded pixel, and generate encoded data.

13. The system of claim 12, wherein the first encoder refers to the reference first pixel on the second line when encoding the target first pixel on the first line, and refers to the reference first pixel on the first line when encoding the target first pixel on the second line.

14. The system of claim 12, wherein the first encoder comprises:
- a differential pulse code modulator configured to apply differential pulse code modulation processing to the first pixel, and generate a first difference signal indicating a difference value between the local decoded pixel and the first pixel;
- a quantizer configured to quantize the first difference signal and generate a first quantized signal;
- a variable length encoder configured to apply variable length encoding processing to the first quantized signal and generate the first encoded pixel;
- an inverse quantizer configured to inverse-quantize the first quantized signal and generate the first difference signal; and
- an inverse differential pulse code modulator configured to apply inverse pulse code modulation processing to the first difference signal and generate the local decoded pixel.

15. The system of claim 12, wherein the image data controller comprises:
- a line memory configured to store the image data by taking a line as unit; and
- a memory controller configured to load the image data stored in the line memory to the first to third encoders.

16. The system of claim 15, wherein the memory controller loads the first pixel to the first encoder, and loads a closest first pixel to the first encoder, the closest first pixel being close to the first pixel in the row direction and the column direction.

17. The system of claim 15, wherein the memory controller loads a set of the first pixel and the third pixel and a set of the first pixel and the second pixel from the line memory.

18. The system of claim 12, further comprising a rearranger configured to rearrange arrangement of the image data to load the first pixels to the first encoder consecutively every cycle, load the second pixels to the second encoder every two cycles, and load the third pixels to the third encoder every two cycles, the third pixels being loaded in cycle in which the second pixels are not loaded.

19. The system of claim 12, further comprising a code rate controller configured to control code rates of the first to third encoders on the basis of the first pixels, the second pixels and the third pixels.

20. A computer implemented method for compressing image, the method comprising:
- extracting, from the image data having color components of at least three kinds arranged in accordance with a Bayer pattern, first pixels, second pixels and third pixels, the first pixels corresponding to a first color component included on a first line and a second line of the image data, the second pixels corresponding to a second color component included on the first line, and the third pixels corresponding to a third color component included on the second line;
- generating a first encoded pixel by referring to a reference first pixel located close to a target first pixel to be encoded in a column direction in the image data and by encoding the target first pixel;
- generating a second encoded pixel by referring to a reference second pixel located close to a target second pixel to be encoded in a row direction in the image data and by encoding the target second pixel;
- generating a third encoded pixel by referring to a reference third pixel located close to a target third pixel to be encoded in the row direction and by encoding the target third pixel; and
- generating encoded data by combining the first encoded pixel, the second encoded pixel and the third encoded pixel.

* * * * *